United States Patent
Pobbathi et al.

(10) Patent No.: US 10,528,907 B2
(45) Date of Patent: Jan. 7, 2020

(54) AUTOMATED CATEGORIZATION OF PRODUCTS IN A MERCHANT CATALOG

(71) Applicant: Yahoo Holdings, Inc., Sunnyvale, CA (US)

(72) Inventors: Nageswara R. Pobbathi, San Jose, CA (US); Anlei Dong, Fremont, CA (US); Yi Chang, Sunnyvale, CA (US)

(73) Assignee: Oath Inc., New York, NY (US)

( * ) Notice: Subject to any disclaimer, the term of this patent is extended or adjusted under 35 U.S.C. 154(b) by 84 days.

(21) Appl. No.: 13/720,703

(22) Filed: Dec. 19, 2012

(65) Prior Publication Data

US 2014/0172652 A1 Jun. 19, 2014

(51) Int. Cl.
*G06Q 10/08* (2012.01)

(52) U.S. Cl.
CPC ................... *G06Q 10/087* (2013.01)

(58) Field of Classification Search
USPC .......................................................... 705/28
See application file for complete search history.

(56) References Cited

U.S. PATENT DOCUMENTS

| | | | | |
|---|---|---|---|---|
| 6,397,221 B1* | 5/2002 | Greef | ................... | G06F 16/9027 |
| 6,751,600 B1* | 6/2004 | Wolin | ................... | G06F 16/353 |
| | | | | 706/12 |
| 6,938,025 B1* | 8/2005 | Lulich | ................... | G06F 16/285 |
| | | | | 706/45 |
| 6,981,040 B1* | 12/2005 | Konig | ................... | H04L 67/20 |
| 7,039,645 B1* | 5/2006 | Neal | ................... | G06Q 30/06 |
| 7,373,313 B1* | 5/2008 | Kahle | ................ | G06Q 30/0256 |
| | | | | 705/26.3 |
| 7,469,246 B1* | 12/2008 | Lamping | ................ | G06F 16/353 |
| 7,636,677 B1* | 12/2009 | McGonigal | ............ | G06Q 30/02 |
| | | | | 705/26.7 |
| 7,647,309 B1* | 1/2010 | Bar | ........................ | G06Q 30/06 |
| | | | | 705/26.1 |
| 7,672,877 B1* | 3/2010 | Acton | ................... | G06F 16/958 |
| | | | | 705/26.1 |
| 7,685,084 B2* | 3/2010 | Sisk | ...................... | G06F 16/951 |
| | | | | 706/45 |
| 7,765,178 B1* | 7/2010 | Roizen | ................ | G06F 16/3346 |

(Continued)

*Primary Examiner* — Ashford S Hayles
(74) *Attorney, Agent, or Firm* — Pillsbury Winthrop Shaw Pittman LLP

(57) ABSTRACT

A system and method is described for large-scale, automated classification of products. The system and method receives information about products, wherein such information includes one or more text metadata fields associated with each product, receives a set of categories, and automatically selects one or more categories from the set of categories to which each product belongs based upon at least one of the one or more text metadata fields associated with each product. A machine learning classifier may be used to automatically select the one or more categories to which each product belongs by operating upon a feature vector for each product derived from text metadata fields of the product description. The machine learning classifier may be trained using a set of pre-categorized product descriptions. The product-category associations generated by the system and method can be used to improve search engine results or product recommendations to consumers.

20 Claims, 9 Drawing Sheets

(56) References Cited

U.S. PATENT DOCUMENTS

| | | | | |
|---|---|---|---|---|
| 7,814,085 B1* | 10/2010 | Pfleger | ............... | G06F 16/951 707/708 |
| 7,849,087 B2* | 12/2010 | Goutte | ............... | G06F 16/355 707/737 |
| 7,870,039 B1* | 1/2011 | Dom | ............... | G06Q 30/0613 705/26.41 |
| 8,117,216 B1* | 2/2012 | Chanda | ............... | G06F 16/9038 707/754 |
| 8,266,003 B1* | 9/2012 | Mirchandani | ...... | G06Q 30/0601 705/14.16 |
| 8,275,765 B2* | 9/2012 | Li | ............... | G06F 16/353 707/722 |
| 8,463,591 B1* | 6/2013 | Chang | ............... | G06F 17/271 704/1 |
| 8,489,532 B2* | 7/2013 | Hunt | ............... | G06Q 20/0855 705/67 |
| 8,495,004 B2* | 7/2013 | Dheap | ............... | G06F 16/2365 707/600 |
| 8,515,828 B1* | 8/2013 | Wolf | ............... | G06Q 30/02 705/26.1 |
| 8,737,728 B2* | 5/2014 | Bhardwaj | ......... | G06Q 30/0643 382/165 |
| 9,146,910 B2* | 9/2015 | Gu | ............... | G06F 17/2247 |
| 9,501,551 B1* | 11/2016 | Weissgerber | ...... | G06Q 30/0282 |
| 10,120,929 B1* | 11/2018 | Khoshnevisan | ...... | G06F 16/285 |
| 2001/0037324 A1* | 11/2001 | Agrawal | ............... | G06F 16/355 |
| 2001/0044758 A1* | 11/2001 | Talib | ............... | G06Q 10/10 705/26.1 |
| 2002/0004764 A1* | 1/2002 | Stolze | ............... | G06Q 30/02 705/26.8 |
| 2002/0010625 A1* | 1/2002 | Smith | ............... | G06Q 30/02 705/14.52 |
| 2002/0026386 A1* | 2/2002 | Walden | ............... | G06Q 30/02 705/14.39 |
| 2003/0050915 A1* | 3/2003 | Allemang | ............... | G06F 16/367 |
| 2003/0105682 A1* | 6/2003 | Dicker | ............... | G06Q 30/02 705/26.8 |
| 2003/0195877 A1* | 10/2003 | Ford | ............... | G06Q 30/02 |
| 2004/0143600 A1* | 7/2004 | Musgrove | ............... | G06Q 20/04 |
| 2005/0120868 A1* | 6/2005 | Hinman | ............... | G10H 1/0041 84/615 |
| 2005/0197883 A1* | 9/2005 | Kettner | ............... | G06Q 30/0203 705/7.35 |
| 2005/0216371 A1* | 9/2005 | Fotteler | ............... | G06Q 10/087 705/28 |
| 2006/0190481 A1* | 8/2006 | Alspector | ............... | G06Q 10/107 |
| 2006/0212350 A1* | 9/2006 | Ellis | ............... | G06Q 30/0242 705/14.41 |
| 2007/0100842 A1* | 5/2007 | Wykes | ............... | G06Q 30/0603 |
| 2007/0150365 A1* | 6/2007 | Bolivar | ............... | G06Q 30/02 705/26.61 |
| 2007/0299743 A1* | 12/2007 | Staib | ............... | G06Q 10/107 705/7.33 |
| 2008/0195596 A1* | 8/2008 | Sisk | ............... | G06F 16/951 |
| 2008/0243637 A1* | 10/2008 | Chan | ............... | G06Q 30/02 705/26.1 |
| 2008/0243816 A1* | 10/2008 | Chan | ............... | G06K 9/6215 |
| 2008/0270334 A1* | 10/2008 | Ma | ............... | G06Q 10/10 706/20 |
| 2009/0248687 A1* | 10/2009 | Su | ............... | G06F 16/2458 |
| 2009/0276368 A1* | 11/2009 | Martin | ............... | G06Q 40/02 705/36 R |
| 2009/0281792 A1* | 11/2009 | Green | ............... | G06F 16/24526 704/9 |
| 2009/0281923 A1* | 11/2009 | Selinger | ............... | G06Q 30/02 705/26.1 |
| 2010/0106555 A1* | 4/2010 | Mneimneh | ............... | G06Q 10/04 705/7.31 |
| 2010/0185577 A1* | 7/2010 | Tsaparas | ............... | G06N 20/00 706/52 |
| 2010/0268661 A1* | 10/2010 | Levy | ............... | G06Q 30/02 705/347 |
| 2010/0293234 A1* | 11/2010 | Schmidt | ............... | G06Q 30/0603 709/206 |
| 2010/0306198 A1* | 12/2010 | Gadacz | ............... | G06F 16/358 707/738 |
| 2010/0313141 A1* | 12/2010 | Yu | ............... | G06Q 30/02 715/747 |
| 2011/0010324 A1* | 1/2011 | Bolivar | ............... | G06N 5/02 706/46 |
| 2011/0078157 A1* | 3/2011 | Sun | ............... | G06Q 30/02 707/749 |
| 2011/0093467 A1* | 4/2011 | Sharp | ............... | G06F 17/2264 707/741 |
| 2011/0196872 A1* | 8/2011 | Sims | ............... | G06F 16/90344 707/740 |
| 2011/0252042 A1* | 10/2011 | Wu | ............... | G06F 16/313 707/748 |
| 2011/0289026 A1* | 11/2011 | Kannan | ............... | G06F 16/907 706/12 |
| 2012/0005044 A1* | 1/2012 | Coleman | ............... | G06Q 30/02 705/27.2 |
| 2012/0102062 A1* | 4/2012 | Gurnani | ............... | G06Q 30/0601 707/769 |
| 2012/0215783 A1* | 8/2012 | Musgrove | ............... | G06F 17/50 707/740 |
| 2012/0233170 A1* | 9/2012 | Musgrove | ............... | G06F 17/30864 707/740 |
| 2012/0233173 A1* | 9/2012 | Yang | ............... | G06Q 30/00 707/740 |
| 2012/0314941 A1* | 12/2012 | Kannan | ............... | G06K 9/6293 382/161 |
| 2013/0066745 A1* | 3/2013 | de Heer | ............... | G06Q 30/0603 705/26.62 |
| 2013/0124528 A1* | 5/2013 | Gourdol | ............... | G06F 16/11 707/740 |
| 2013/0124529 A1* | 5/2013 | Jacob | ............... | G06F 9/44505 707/740 |
| 2013/0151957 A1* | 6/2013 | Kuroiwa | ............... | G06F 17/2211 715/256 |
| 2014/0108189 A1* | 4/2014 | Schumann | ............... | G06Q 30/0631 705/26.7 |
| 2015/0046281 A1* | 2/2015 | Shivaswamy | ............... | G06Q 30/0631 705/26.7 |
| 2015/0170250 A1* | 6/2015 | Dalal | ............... | G06Q 30/0643 705/26.7 |
| 2017/0124612 A1* | 5/2017 | Musgrove | ............... | G06F 17/50 |

* cited by examiner

AUTOMATED CATEGORIZATION OF PRODUCTS IN A MERCHANT CATALOG

BACKGROUND

Technical Field

The present invention generally relates to product classification. In particular, the present invention relates to techniques for automated product classification, product search, and product recommendation.

Background Art

The Internet has emerged as a powerful engine of commerce. Consumers increasingly turn to the Internet when they wish to purchase a product instead of visiting a brick-and-mortar store. To find a product, consumers will often visit a Web site of an online merchant, browse an online marketplace such as YAHOO!® Shopping, or use a search engine to search for a product or browse products by category.

When a consumer searches for a product online, the relevance of the results returned depend on how accurately the products have been categorized in an electronic commerce (aka "e-commerce") catalog. When products are accurately categorized, the consumer is more likely to find high value results and to subsequently make an online purchase.

E-commerce products are often manually assigned to a category by the merchants who offer the products. The manual categorization of products takes time and is costly. The time and cost can make it difficult for a merchant to keep product classifications relevant and up to date when the classification taxonomy changes.

Systems of categorization can vary widely in the marketplace, causing problems for merchants who may need to change product categorizations for different purposes. For example, a merchant with a categorization system oriented towards end consumers might offer products from a supplier who uses a categorization system oriented towards wholesalers that does not make sense to the end consumer. Alternatively, an online merchant may wish to send a product feed to a feed aggregator that aggregates the products of multiple merchants in the same online marketplace. If the feed aggregator uses a different system of categories from the merchant, the merchant categorizations may be irrelevant to or incompatible with the marketplace. For these and many other reasons, a merchant may need to frequently update product categorizations in a product catalog to keep the categories consistent, relevant and useful to consumers and the marketplace.

In view of the foregoing, it may be deemed desirable to provide a system to automatically categorize products. Ideally, the desired system should enable products to be categorized in a manner that is faster, less expensive and more accurate than conventional solutions.

BRIEF SUMMARY

Systems and methods for the automatic classification of products are described herein. The products may include those listed in a merchant catalog and/or sold in an online marketplace. In accordance with certain implementations, the system and methods enable merchants, operators of online marketplaces, and others to automatically categorize products into a taxonomy of product categories based on information associated with the products. The automatic categorization may operate by analyzing certain text metadata fields that are associated with the products.

In particular, a method is described herein. In accordance with the method, information about a product is received. The information about the product includes one or more text metadata fields. The text metadata fields may include, for example, a title associated with the product, a description of the product, and a brand name associated with the product. A set of categories is also received. One more categories to which the product belongs are then automatically selected from the set of categories based upon at least the one or more text metadata fields.

In one embodiment, automatically selecting the one or more categories from the set of categories to which the product belongs based upon the one or more text metadata fields includes estimating a probability that the product belongs to each category in the set of categories based upon the one or more text metadata fields and associating the product with a particular category in the set of categories if the estimated probability that the product belongs to the particular category is among a set of highest estimated probability results for the set of categories.

In further accordance with such an embodiment, estimating the probability that the product belongs to each category in the set of categories based upon the one or more text metadata fields may include generating a feature vector that represents the product based on the one or more text metadata fields and processing the feature vector in a machine learning classifier, such as a Naïve Bayes machine learning classifier, that estimates the probability that the product belongs to each category in the set of categories based upon the feature vector. Generating the feature vector may include concatenating the one or more text metadata fields into a paragraph, extracting one or more tokens from the paragraph, and deriving a frequency number for each token by counting instances of each token in the paragraph. The frequency number associated with each token may be weighted based on which text metadata field the token came from. The machine learning classifier may be trained using at least one product catalog that includes text descriptions of one or more products and categories associated therewith.

The product-category associations generated in accordance with the foregoing method may be provided to a search engine for use in providing search results or a recommendation for use in providing product recommendations.

A first system is also described herein. The system includes one or more computing machines, a product classifier and a search engine. The product classifier is executed by at least one of the one or more computing machines to receive information about products, the information about the products including one or more text metadata fields associated with each of the products, to receive a set of categories, and to automatically associate each product with one or more categories from the set of categories based upon the one or more text metadata fields associated with the product. The search engine is executed by at least one of the one or more computing machines to receive a search query and to identify at least one product in response to the search query based at least in part on the associations between categories and products generated by the product classifier.

In one embodiment, the search engine is executed by at least one of the one or more computing machines to determine that the search query is associated with a particular category and to identify at least one product associated with the particular category based at least upon the associations between categories and products generated by the product classifier.

In another embodiment, the search engine is executed by at least one of the one or more computing machines to determine that the search query is associated with a first product, to determine that the first product is associated with a particular category based at least upon the associations between categories and products generated by the product classifier, and to identify a second product associated with the particular category based at least upon the associations between categories and products generated by the product classifier.

In yet another embodiment, the search engine is executed by at least one of the one or more computing machines to determine that the search query is associated with a particular brand name, and to identify products associated with the brand name that are also associated with a plurality of different categories based at least upon the associations between categories and products generated by the product classifier.

A second system is also described herein. The second system includes one or more computing machines, a product classifier and a recommendation engine. The product classifier is executed by at least one of the one or more computing machines to receive information about products, the information about the products including one or more text metadata fields associated with one of the products, to receive a set of categories, and to associate each product with one or more categories from the set of categories based upon the one or more text metadata fields associated with the product. The recommendation engine is executed by at least one of the one or more computing machines to determine that a user has accessed a document associated with a first product, to determine that the first product is associated with a particular category based at least upon the associations between categories and products generated by the product classifier, and to identify a second product associated with the particular category for recommendation to the user based at least upon the associations between categories and products generated by the product classifier. Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
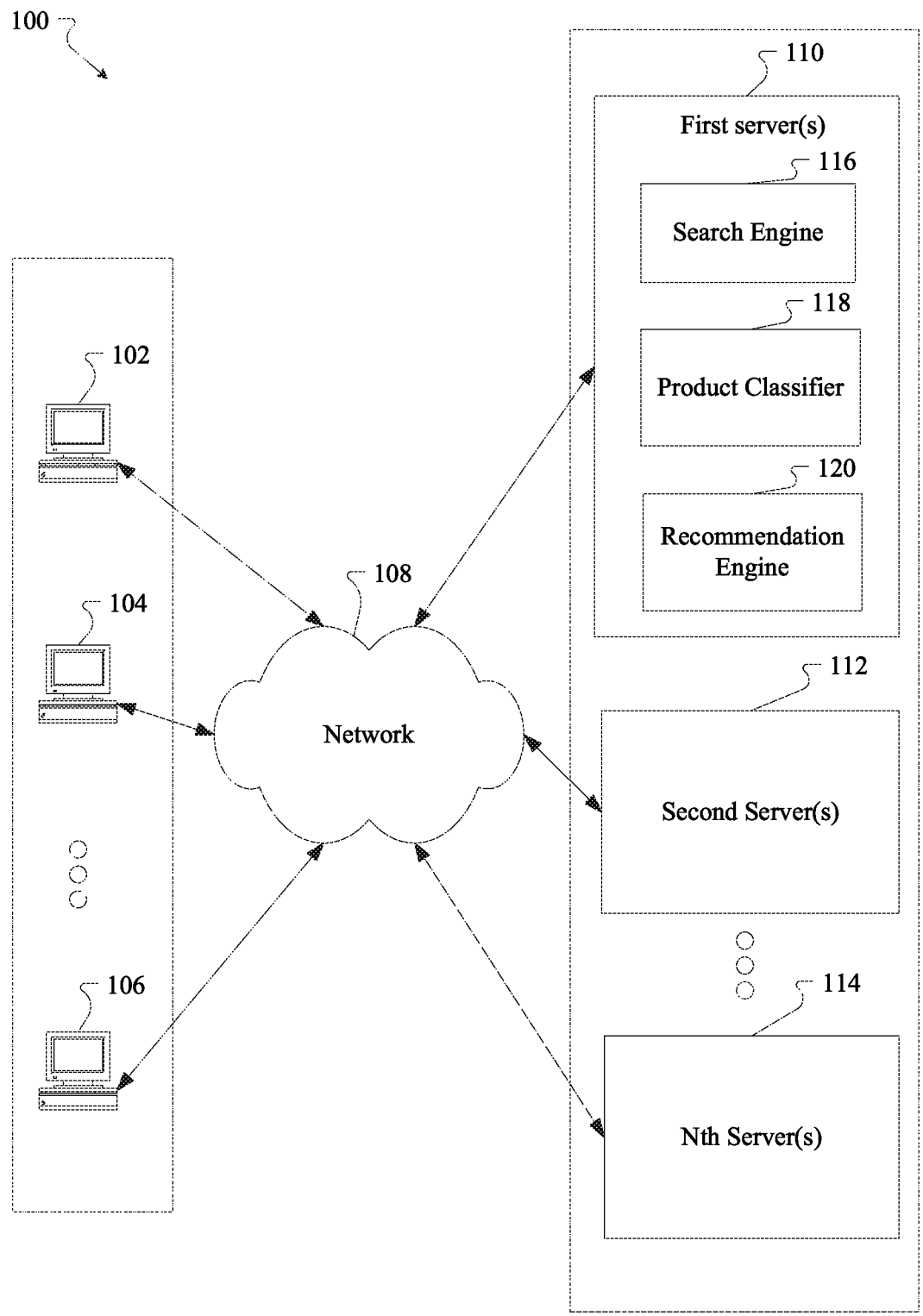
FIG. 1 is a block diagram of an example information retrieval system in which an automatic product classifier in accordance with an embodiment may be implemented.

Example embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

The terms categories, classifications, and taxonomy are used interchangeably in the disclosure of this application. The product classifier is also referred to as a classification function.

The detailed description describes steps corresponding to the flowcharts depicted in the accompanying drawings. It will be recognized that such steps can be performed in any order unless otherwise stated in the application.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example Automatic Product Classifier and Systems Including Same

FIG. 1 depicts a block diagram of an example information retrieval system 100 in which an automatic product classifier in accordance with an embodiment may be implemented. Generally speaking, information retrieval system 100 operates to provide information to users in response to requests (e.g., hypertext transfer protocol (HTTP) requests) that are received therefrom. The information may include documents (e.g., Web pages), images, video files, output of executables, and/or other types of information. For example, information retrieval system 100 may provide search results in response to search queries that are submitted by users. In accordance with this example, the search results may correspond to (e.g., identify) products. As shown in FIG. 1, computer system 100 includes a plurality of user systems 102, 104, . . . 106, a network 108, and a plurality of servers 110, 112, . . . 114. Communication among user systems 102, 104, . . . 106 and servers 110, 112, . . . 114 is carried out over network 108 using well-known network communication protocols. Network 108 may be a wide-area network (e.g., the Internet), a local area network (LAN), another type of network, or a combination thereof.

User systems 102, 104, . . . 106 are processing systems that are capable of communicating with servers 110, 112, . . . 114. Three user systems and three servers are shown in FIG. 1 for illustrative purposes only and are not intended to be limiting. It will be recognized by persons skilled in the relevant art(s) that computer system 100 may include any number of user systems and any number of servers. An example of a processing system is a system that includes at least one processor that is capable of manipulating data in accordance with a set of instructions. For instance, a processing system may be a computer, a smart phone, a personal digital assistant, etc. User systems 102, 104, . . . 106 are configured to provide requests to servers 110, 112, . . . 114 for requesting information stored on (or otherwise accessible via) servers 110, 112, . . . 114. For instance, a user may initiate a request for information using a client (e.g., a Web browser, a Web crawler, a non-Web-enabled client, etc.) deployed on a user system 102 that is owned by or otherwise accessible to the user. In accordance with some example embodiments, user systems 102, 104, . . . 106 are capable of accessing Web sites hosted by servers 110, 112, . . . 114, so that user systems 102, 104, . . . 106 may access information that is available via the Web sites. Such Web sites include Web pages, which may be provided as hypertext markup language (HTML) documents and objects (e.g., files) that are linked therein, for example.

It will be recognized that any one or more user systems 102, 104, . . . 106 may communicate with any one or more servers 110, 112, . . . 114. Although user systems 102, 104, . . . 106 are depicted as desktop computers in FIG. 1, persons skilled in the relevant art(s) will appreciate that user systems 102, 104, . . . 106 may include other types of systems and devices, including but not limited to a laptop computer, a tablet computer, a personal digital assistant, a cellular telephone, or the like.

Servers 110, 112, . . . 114 are processing systems that are capable of communicating with user systems 102, 104, . . . 106. Servers 110, 112, . . . 114 are configured to execute software programs that provide information to users in response to receiving requests from the users. For example, the information may include documents (e.g., Web pages) images, video files, output of executables, or any other suitable type of information. In accordance with some example embodiments, servers 110, 112, . . . 114 are configured to host respective Web sites, so that the Web sites are accessible to users of computer system 100.

One type of software program that may be executed by any one or more of servers 110, 112, . . . 114 is a search engine. A search engine is executed by a server to search for information in a networked computer system based on search queries that are provided by users. First server(s) 110 is shown to include a search engine module 116 for illustrative purposes. Search engine module 116 is configured to execute a search engine. For instance, search engine module 116 may search among servers 110, 112, . . . 114 for requested information that is relevant to a search query. Such requested information may correspond to products.

First server 110 is also shown to include a product classifier 118. In general, product classifier 118 is configured to automatically categorize products into a set of categories using information about the products. The information about the products includes text metadata fields, such as title, product description and brand name. In one embodiment, the set of categories is a taxonomy that has been selected to categorize the products. Product classifier 118 automatically associates each product with one or more of the set of categories based on the information about the product.

First server 110 is also shown to include a product recommendation engine 120. Product recommendation engine 120 is configured to determine that a user is looking at a Web page associate with a first product. Product recommendation engine 120 determines the category that product classifier 118 has associated with the first product, and recommends a second product, which product classifier 118 has associated with the same category.

Search engine 116, product classifier 118 and product recommendation engine 120 can be executed inside any of servers 110, 112 . . . 114, or inside any other processing system. Product classifier 118 and product recommendation engine 120 may also be executed inside of search engine 116.

Figure 2:
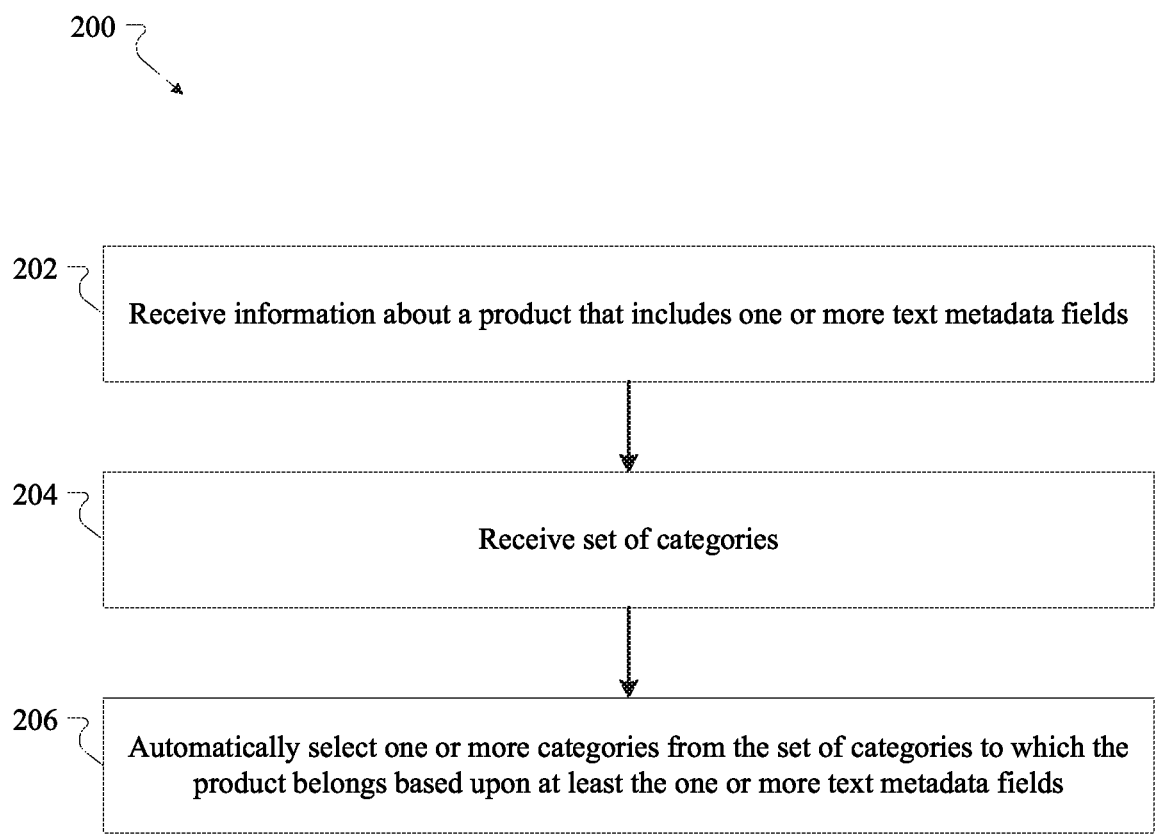
FIGS. 2, 4 and 5 depict flowcharts of example methods for performing automatic product classification in accordance with embodiments.
Figure 4:
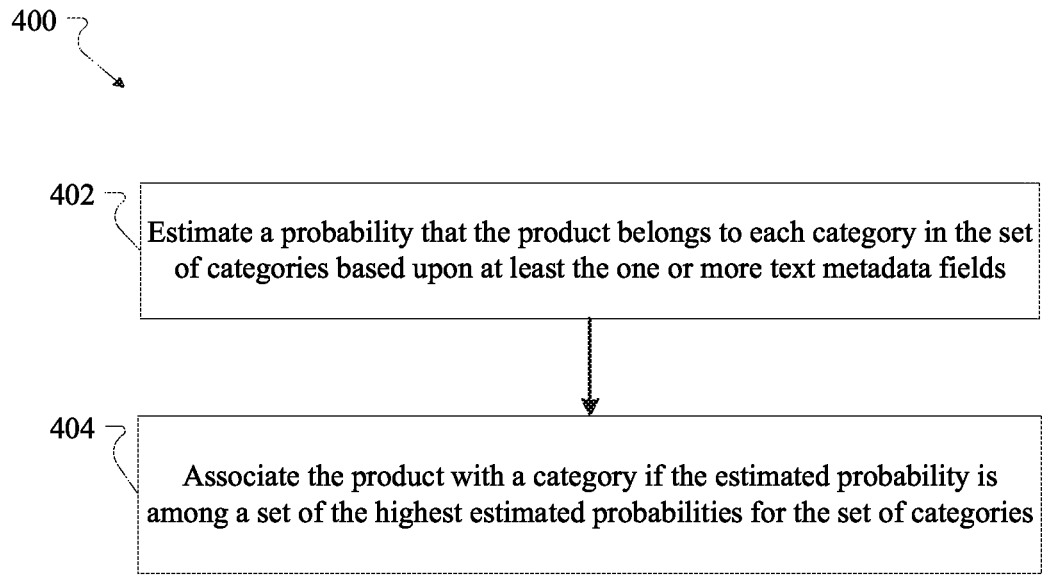
Figure 5:
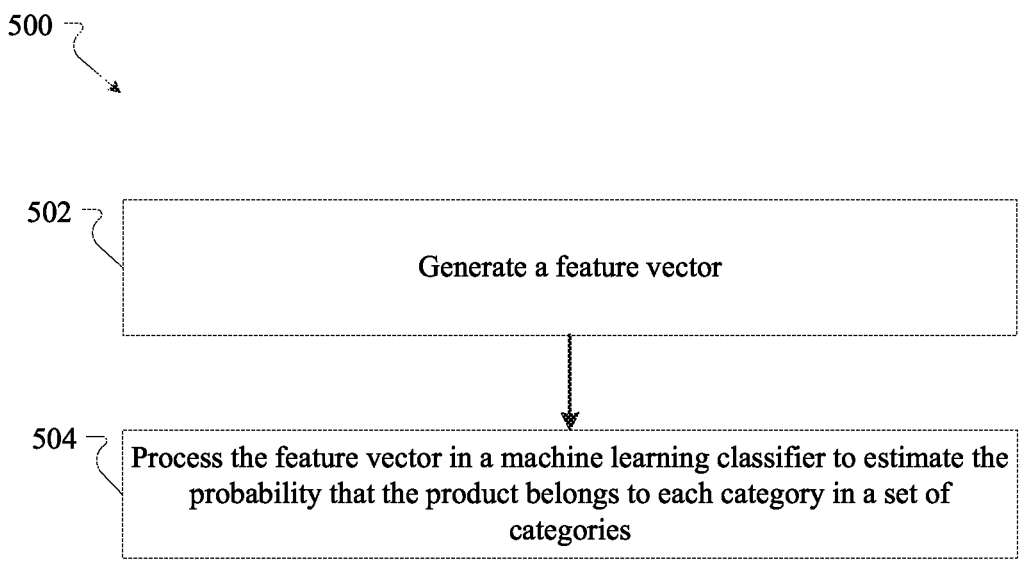

FIGS. 2, 4 and 5 depict flowcharts 200, 400 and 500, respectively, of example methods performed by a product classifier in accordance with various embodiments. The methods of flowcharts 200, 400, and 500 may each be performed by product classifier 118 of information retrieval system 100 shown in FIG. 1, for example.

As shown in FIG. 2, the method of flowchart 200 begins at step 202. In step 202, information about a product is received. The information about the product includes one or more text metadata fields. A product may be any durable good or service that is offered for sale in a paper, electronic, or online catalog that contains text descriptions of products. The product description can be of the type typically found on a merchant Web site, in an online catalog, or an online marketplace, such as YAHOO!® Shopping or AMAZON.COM®. The one or more text metadata fields may include, but are not limited to: title, product description, brand name, size, review, shipping information, price, technical details, etc. An example of a product description can be found in FIG. 6, which is described below.

At step 204, a set of categories is received. The set of categories can be any predetermined set of categories to which products can be matched. There are many sources of product categories used by merchants, wholesalers, and aggregated marketplaces. For example, a set of categories may have been designed by a merchant to match what the merchant believe consumers understand when browsing for products. Alternatively, a merchant may have adopted a set of categories to harmonize with the categories used by a feed aggregator who will list the merchant's products on E-commerce Web sites. Another possibility is that the categories may have been provided to the merchant by the product manufacturer. In an exemplary embodiment, a universal taxonomy may be used to classify products so that product catalogs are compatible with one another.

In embodiments, the set of categories can be unstructured, or the set of categories may have hierarchical structure, including nodes and branches of subcategories. A product can be assigned to a single category or multiple categories.

Figure 3:
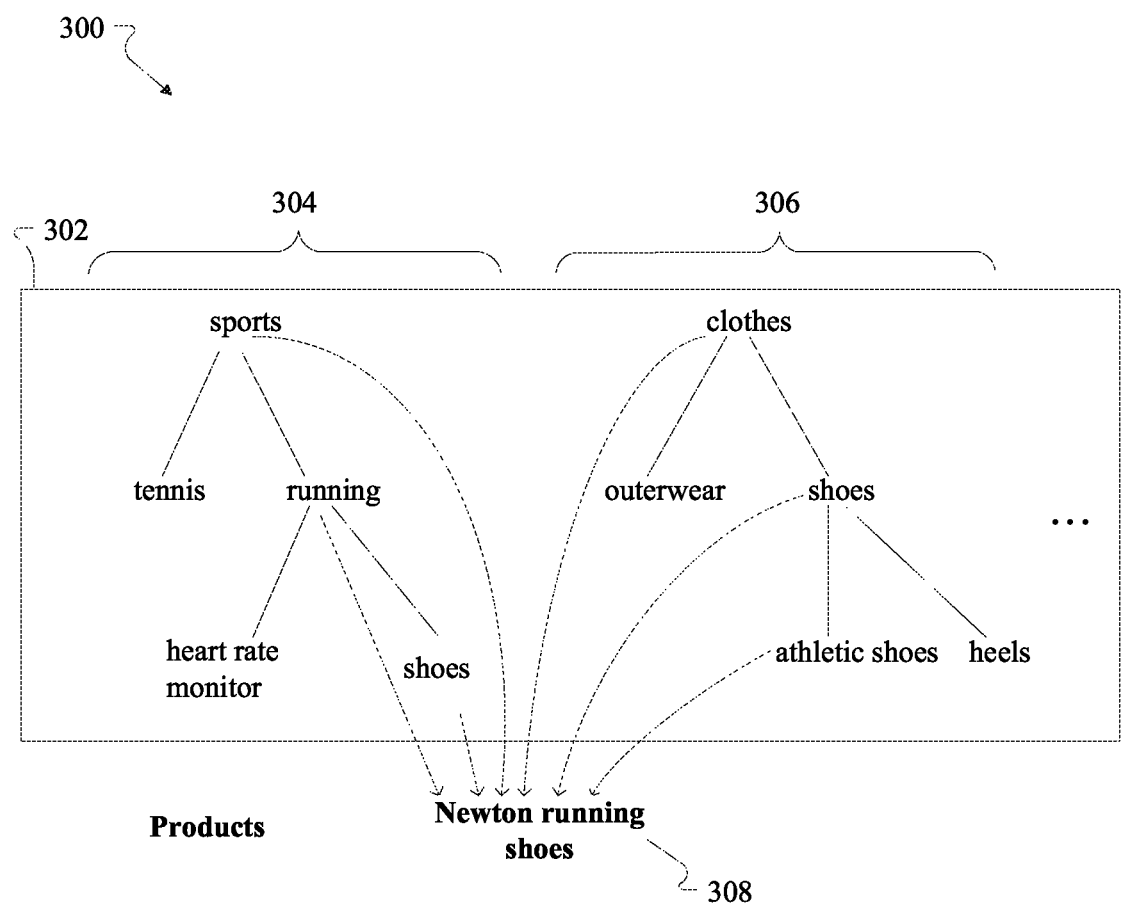
FIG. 3 is a block diagram of an example product categorization scheme in accordance with an embodiment.

An example set of categories that may be received during step 204 will now be described in reference to FIG. 3. In particular, FIG. 3 depicts a block diagram of an example product categorization scheme 300 in accordance with an embodiment. Product categorization scheme 300 includes a set of categories 302. Set of categories 302 is shown as containing two classification trees 304 and 306 for the sake of simplicity. However, a product categorization scheme may feature any number of classification trees. Each classification tree features multiple nodes and branches, wherein the nodes comprise categories and subcategories and the branches indicate which subcategories are included within a category. In FIG. 3, the branches are represented as solid lines running between certain categories and subcategories. In particular, classification tree 304 features the top category and node "sports," branching into the subcategories "tennis" and "running." The "running" subcategory is a further node that branches into the subcategories "heart rate monitor" and "shoes" in turn. Classification tree 306 features category and top node "clothes," which branches into the further subcategories "outerwear" and "shoes." The "shoes" category is also a node that branches into the "athletic shoes" and "heels" subcategories.

Allowing a product to concurrently belong to multiple categories, and/or multiple hierarchies can make a product categorization more useful to the various users, merchants, feed aggregators, search engines, etc. By featuring multiple classification trees 304 and 306, set of categories 302 can incorporate different product hierarchies relevant to different merchants. Moreover, a single category can be associated with multiple hierarchic trees, each of which may be useful for a different context in commerce. For example, in set of categories 302, a product 308 is provided. Product 308 is a pair of Newton running shoes. The dotted lines in FIG. 3 represent that product 308 has been associated with certain categories in set of categories 302. Product 308 is associated with the category "shoes," which can be found in both classification tree 304 and classification tree 306, in addition to "sports," "running," "shoes," "clothes," and "athletic shoes."

Product categorization scheme 300 was described above to provide one example of a set of categories that may be received during step 204 of flowchart 200 and is not intended to be limiting. Persons skilled in the relevant art(s) will appreciate that other sets of categories associated with other product categorization schemes may be received during step 204 as well.

Returning now to the description of flowchart 200 of FIG. 2, in step 206, one or more categories are automatically selected from the set of categories to which the product belongs based upon at least the one or more text metadata fields. This classification of products may be automated using any algorithm that determines one or more categories for a product based upon information about a product that contains one or more text metadata fields.

FIG. 4 depicts a flowchart 400 of one example method for performing step 206 of flowchart 200. As shown in FIG. 4, the method of flowchart 400 begins at step 402. In step 402, a probability is estimated that the product belongs to each category in the set of categories based upon the one or more text metadata fields. Each probability value indicates a probability that the product belongs to a particular category. The probability values are estimated based upon the one or more text metadata fields included in the information about the product.

In step 404, the product is associated with a category if the estimated probability for the category is among a set of the highest estimated probabilities for the set of categories. In one embodiment, the product is associated with the category for which the greatest estimated probability is obtained. In another embodiment, the product is associated with all of the categories for which estimated probabilities have been obtained that exceed a threshold. In a further embodiment, the product is associated with a predetermined number of categories for which the highest estimated probabilities have been obtained. Alternatively, a combination of any of these techniques may be used.

FIG. 5 depicts one example method for performing step 402 of flowchart 400—namely, estimating the probability that a product belongs to each category in the set of categories based on the one or more text metadata fields. As shown in FIG. 5, the method of flowchart 500 begins at step 502, during which a feature vector is generated. In one embodiment, the feature vector comprises an n-dimensional vector representing the frequencies of various terms within a document. The document used to create the feature vector of step 502 may comprise a concatenation of the one or more text metadata fields.

Figure 6:
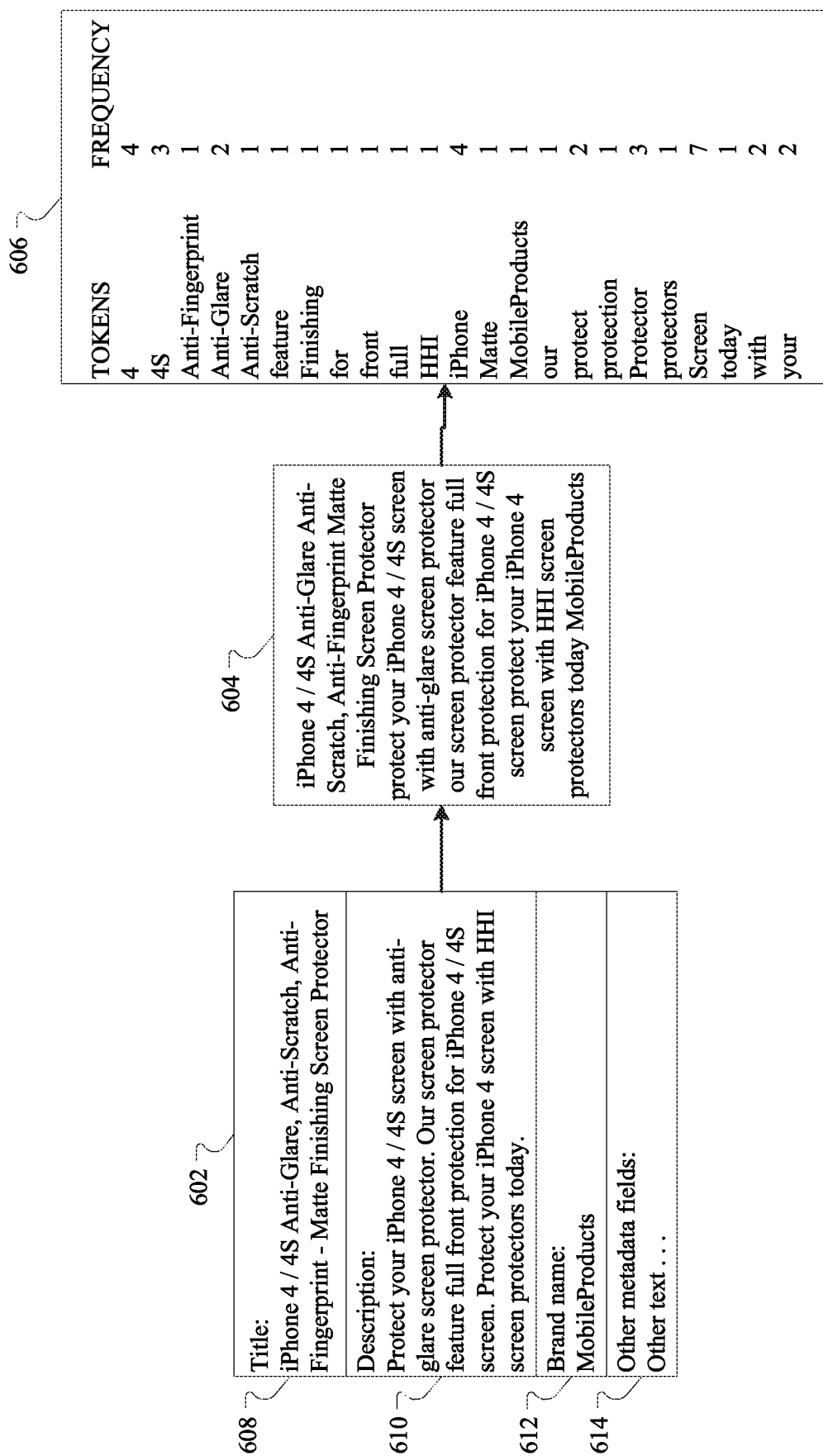
FIG. 6 illustrates an example method of generating a feature vector in accordance with an embodiment.

FIG. 6 depicts one example of how step 502 may be performed. The example of FIG. 6 relates to one exemplary embodiment only and is not intended to be limiting.

As shown in FIG. 6, information 602 about a product includes several text metadata fields. In particular, information 602 includes: a title 608, a product description 610, and a brand name 612. Information 602 could also include other text metadata fields 614, such as a product review, a product specification, or the like.

Document 604 is created when text metadata fields 608, 610, 612, and 614 of information 602 are concatenated together. By counting the frequency of each term in document 604, feature vector 606 is created. Feature vector 606 includes a token for each term that can be found in document 604, along with a corresponding frequency, wherein the frequency represents the number of times that the term appeared in document 604. For example, since the term "iPhone" appears four times in document 604 (once in the text obtained from title 608 and three times in the text obtained from product description 610), the token "iPhone" is associated with a frequency of four in feature vector 606.

In some embodiments, feature vector 606 may be weighted so that the frequencies of various tokens are increased or decreased according to further criteria that are found to be relevant to product categorization. It may be determined that some metadata fields are more helpful than others in predicting a classification for a product. For example, if title 608 is be found to be a more helpful predictor of proper product classification than other metadata fields, terms that appear in title 608 may be weighted such that they will have a higher frequency value, while terms that appear in product description 610, brand name 612, or other metadata fields 614 may not be so weighted. For example, the title of a product may be weighted by a factor of two. In the example of information 602, the word "iPhone" appears in title 608 once, which when weighted will result in a respective frequency of 2. In product description 610 "iPhone" appears three times, accounting for a respective frequency of three. The resulting frequency assigned to the token "iPhone" in feature vector 606 would therefore be five if title 608 is weighted by a factor of 2. Determining how to weight a feature vector may be determined and validated at the classifier training stage, which is further discussed below.

In some embodiments, stop words may be removed from feature vector 606. Stop words are those words that are known to not aid in the classification of a product. Examples of potential stop words may be "a," "the," "and," etc.

Returning now to the description of flowchart 500 of FIG. 5, in step 504 the feature vector is processed in a machine learning classifier to estimate the probability that the product belongs to each category in a set of categories. A machine learning classification, also known as statistical text classification, develops a set of rules from a set of training data, or training documents. In accordance with certain embodiments, the training documents comprise product information obtained from a product catalog. The machine learning classifier is created via supervised learning, because a human is involved in directing the learning process.

Product classification predicts whether each product belongs to each category of a set of categories. A training classifier implements logic that effectively defines a category, or at least a portion of a category. Each of one or more classifiers may comprise an algorithm such as a machine learning algorithm. Some embodiments may use, for example, a gradient boosted decision tree (GBDT), a neural net or kernel based support vector machine (SVM) or other machine learning algorithm. A GBDT algorithm may be well-suited to a set of candidate features of varied types (e.g. categorical, ordinal, continuous). GBDT algorithms are invariant to order preserving transformations of variables, which means there is no need to modify or normalize features. GBDT can naturally quantify the importance of feature variables. GBDT is able to handle missing feature values. Performance may be improved by tuning GBDT parameters, such as the number of trees used in boosting, the size of each tree and the shrinkage factor.

Each classifier may comprise different types of supervised, semi-supervised and unsupervised machine learning algorithms. Each classifier may be trained and tested using manually classified product descriptions. The type of training and test data, e.g., positive and/or negative examples, may depend on the type of algorithm deployed by a classifier. For example, a classifier may comprise a supervised machine learning algorithm trained on a partial set of entity-specific classifications. In some embodiments, a training set may comprise several hundred known classifications of candidate-resources to train an algorithm to classify tens of millions of candidate resources for several hundred thousand entities.

In some embodiments, training data may be generated by having human editors confirm products belonging to a classification for a random sample of entities. Test data may be determined in the same way. Test data may be used to evaluate algorithm precision. Analyses of test results may lead to improvements in classifier algorithms. Products in the class are labeled positive while products not in the class are labeled negative. It is possible for each product to have more than one category.

Classification may be split into two or more classifiers. In addition to splitting a classifier, one or more classifiers may also comprise multiple stages. A multi-stage classifier may comprise multiple stages of specialized classifiers focusing on, for example, a particular subtopic or purpose of classification such as location, type and name classification relative to a specific entity followed by aggregation of these staged classifiers for an overall filtering or match classification of a candidate relative to an entity. Staged classification may permit greater reusability of portions of or all of a classifier for different classes. As between different classes, features may be weighted differently and aggregate results may be assembled and processed differently to classify candidates for different classes relative to specific entities.

In some embodiments, classifiers may simultaneously or serially score/rank candidate products for more than one category. In some embodiments, the ability to simultaneously classify products for a plurality of categories may be limited to related categories where the same or similar features are pertinent to classification. In some embodiments, the same classifier may be used for different categories by adjusting feature weights for different classes.

Classifiers may utilize constraints where desirable. For example, thresholds may be set such that none or more products may be classified as being in the category depending on whether they are above a threshold score. Such thresholds may control both precision and recall. The level of precision permitted under processing constraints or desired for a particular application may vary from one embodiment to the next.

In an exemplary implementation of step 504, a Naïve-Bayes machine learning classifier may be applied to train a machine learning classifier and subsequently classify products into categories. Naïve-Bayes text classification is also known as multinomial Naïve-Bayes. There may be other algorithms which can achieve more accurate classification accuracy, some of which are discussed above, but the Naïve-Bayes algorithm offers the advantage of being straightforward and easy to implement in real-world production systems. The Naïve-Bayes machine learning classifier is discussed in depth in CHRISTOPHER D. MANNING, An Introduction to Information Retrieval 256-253 (2009), which is incorporated by reference herein.

Naïve-Bayes is a supervised probabilistic learning method, which estimates the probability that a document d is belonging to class c is the most likely or maximum posteriori (MAP) class $c_{map}$:

$$c_{map} = argmax_{c \in C} \hat{P}(c) \prod_{1 \leq k \leq D} \hat{P}(t_k | c)$$

The hat notation $\hat{P}$ denotes that a parameter represents an estimated probability, rather than a calculated one. The probability estimated by Naïve-Bayes machine learning classifier is based on a training set of data. $\hat{P}(t_k|c)$ is the conditional probability of term $t_k$ occurring in a document of class c. $\hat{P}(c)$ is the prior probability of document occurring in class c. Both $\hat{P}(c)$ and $\hat{P}(t_k|c)$ are trained in the learning stage of the classification process, and then used to classify documents with the equation above.

The prior probability $\hat{P}(c)$ represents the prior probability that a particular product will occur in a particular product category:

$$\hat{P}(c) = \frac{N_c}{N}$$

where $N_c$ represents the total number of products in a category (for example, products in "sporting goods"). N represents the total number of products in the training set of data.

The conditional probability $\hat{P}(t_k|c)$ for the training data represents the conditional probability that a term $t_k$ will occur in a product description of a specific category:

$$\hat{P}(t_k | c) = \frac{T_{ct} + 1}{\sum_{t' \in V} (T_{ct'} + 1)}$$

where $T_{ct}$ represents the number of occurrences of a term t in the training documents for a particular category. $T_{ct}$ includes multiple instances of a term across product descriptions. $\sum_{t' \in V}(T_{ct'}+1)$ represents the summation of the frequencies of all tokens in a category. Once the classifier has been trained, $\hat{P}(c)$ and $\hat{P}(t_k|c)$ are used to classify new products.

In one embodiment, the methods of flowchart 400 and flowchart 500 represent the classification stage of a machine learning algorithm. The probabilities calculated in steps 402 and 504 may be ranked to determine which categories are most likely and least likely to be associated with a product.

C. Example Product Classifier and Search Engine System

Figure 7:
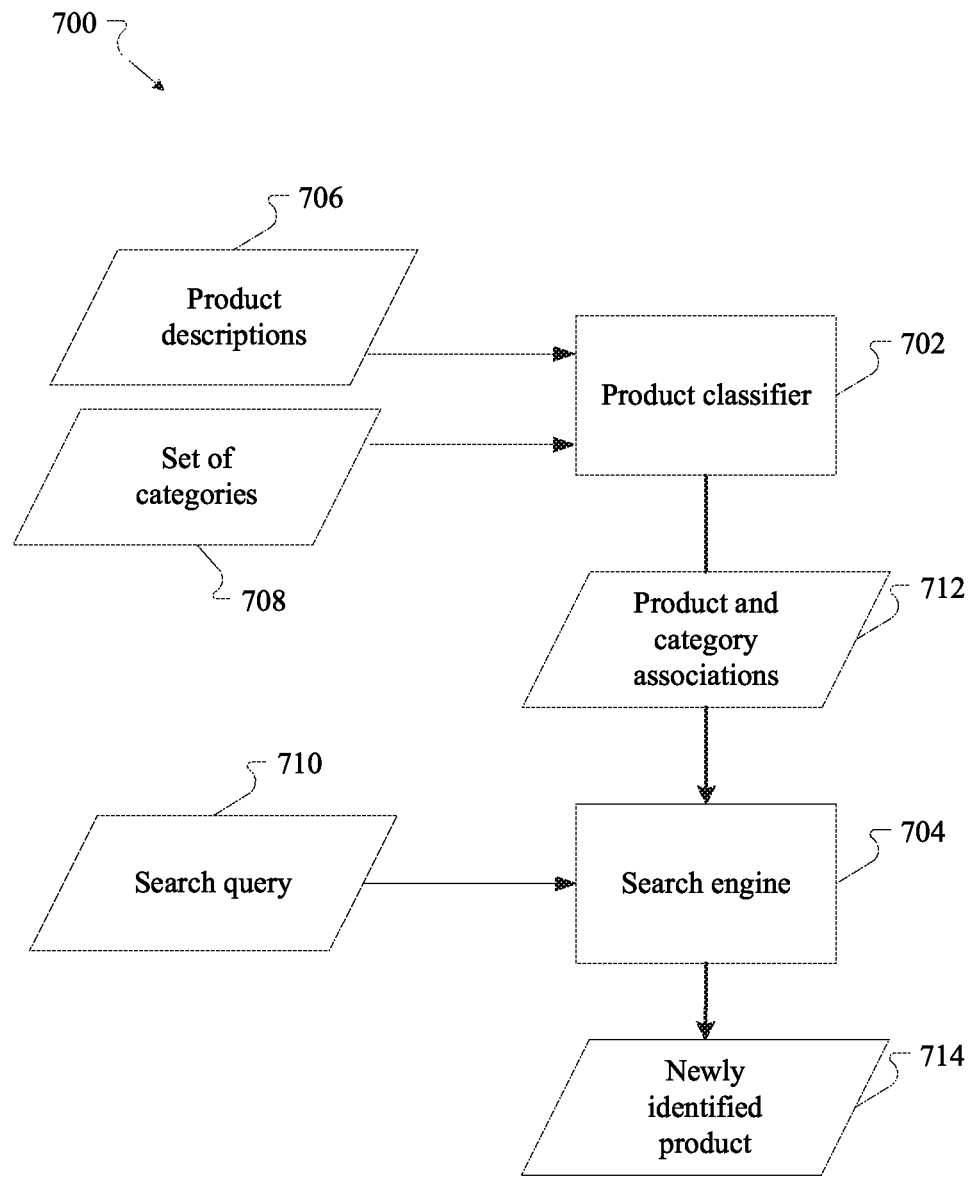
FIG. 7 is a block diagram of a system including a product classifier and search engine, in accordance with an exemplary embodiment.

FIG. 7 is a block diagram of an example information retrieval system 700 in accordance with a further embodiment. As shown in FIG. 7, information retrieval system 700 includes a product classifier 702 and a search engine 704. Search engine 704 may comprise an example implementation of search engine module 116 and product classifier 702 may comprise an example implementation of product classifier 118. Product classifier 702 receives product information 706 and a set of categories 708. Based upon text metadata fields included in product information 706 and set of categories 708, product classifier 702 automatically associates products with one or more categories in set of categories 708, thereby creating product and category associations 712. Example methods of operation of product classifier 702 were described above in reference to flowcharts 200, 400, and 500.

Search engine 704 receives a search query 710 and product and category associations 712. Search engine 704 determines a newly identified product 714 based upon search query 710 and the associations identified between products and categories found in product and category associations 712.

Search engine 704 comprises a system that is designed to help users search for and obtain access to resources that are stored at a multitude of different interconnected nodes within the World Wide Web. Such resources may include, for example, Web pages, text files, audio files, image files, video files, or the like. Search engine 704 may comprise, for example, a publicly-available Web search engine such as YAHOO!® Search (www.yahoo.com), provided by Yahoo! Inc. of Sunnyvale, Calif., BING™ (www.bing.com), provided by Microsoft Corporation of Redmond, Wash., and GOOGLE™ (www.google.com), provided by Google Inc. of Mountain View, Calif.

Information that search engine 704 returns to a user may include a unique identifier of a resource, a title associated with the resource, and a short summary that briefly describes the resource. The unique identifier of the resource may comprise, for example, a Uniform Resource Locator (URL). The URL may be provided in the form of a link that, when activated by a user, causes a user computer to retrieve the associated resource from a node within World Wide Web.

Figure 8:
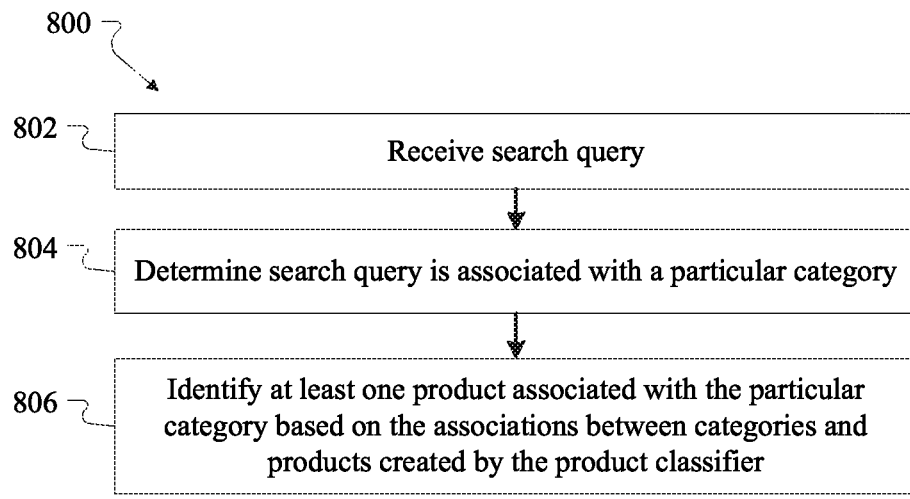
FIGS. 8-10 depict flowcharts of example methods of operation of a search engine in accordance with various embodiments.

FIG. 8 depicts a flowchart of a method of operation of search engine 704 in accordance with an embodiment. As shown in FIG. 8, the method of flowchart 800 begins at step 802, during which search query 710 is received. Search query 710 may comprise, for example, a text string containing one or more search terms, or words.

In step 804, search query 710 is determined to be associated with a particular category. In one embodiment, search engine 704 may determine that search query 710 is related to a product category by classifying search query 710 using product classifier 702. In another embodiment, search engine 804 may consult product and category associations 712 compiled by product classifier 702 to help determine the particular category. In a further embodiment, search engine 704 may associate a search query with a product category automatically using any other suitable algorithm or technique.

In step 806, search engine 704 identifies at least one product as associated with the particular category based on the associations between categories and products created by product classifier 702. Search engine 704 may search for the products associated with particular category in product and category associations 712. Search engine 704 can then provide information about newly identified product 714 to the user who submitted search query 710.

Figure 9:
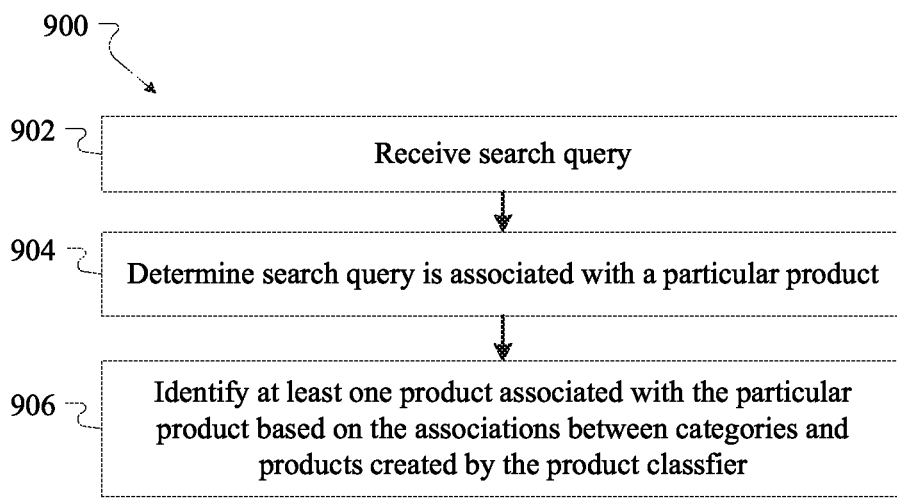

FIG. 9 depicts a flowchart 900 of another method of operation of search engine 704 in accordance with a further embodiment. As shown in FIG. 9, the method of flowchart 900 begins at step 802, during which search engine 704 receives search query 710.

In step 904, search engine 704 determines that search query 710 is related to a particular product. Search engine 704 may use any suitable method to determine that search query 710 is related to the particular product.

In step 906, search engine 704 identifies at least one product associated with the particular product based on the associations between categories and products created by product classifier 702. In one embodiment, search engine 712, upon identifying search query 710 as a product search, may consult product and category associations 712 to determine which category or set of categories are associated with the particular product being searched. Upon determining one or more categories associated with the particular product being searched, search engine 704 can next determine what other products are associated with those one or more categories by consulting product and category associations 712 again. Search engine 712 next identifies at least one newly identified product 714 from the products associated with the category. Search engine 712 can then provide newly identified product 714 to the user who initiated search query 710.

In a further embodiment, search engine 704 may rank the newly identified products identified if there is more than one newly identified product 714. The top ranked results returned may be those products that best match the user's product search query. The next highest ranked results may include products from the categories associated with the top ranked result in the product and category associations 712.

Figure 10:
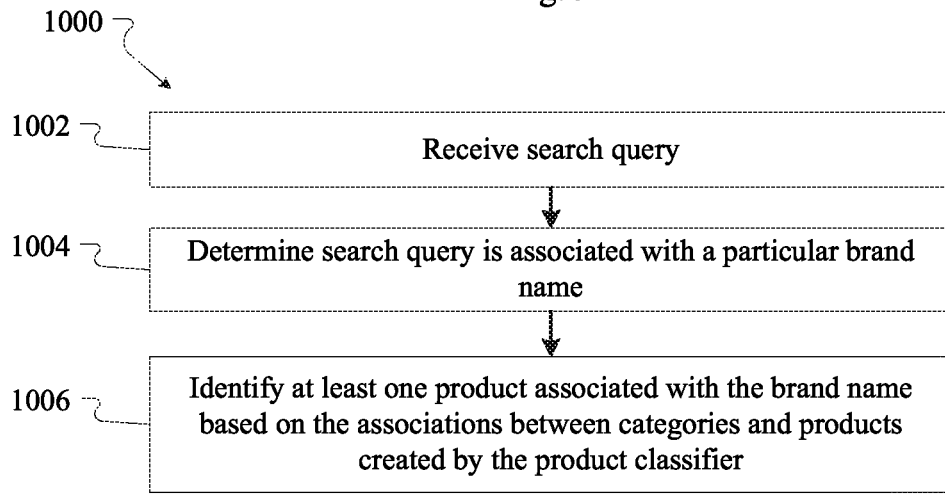

FIG. 10 depicts a flowchart 1000 of another method of operation of search engine 704 in accordance with a further embodiment. In accordance with the method of flowchart 1000, search engine 704 determines that search query 710 is associated with a particular brand name and identifies at least one product associated with the particular brand name based on the associations between categories and products created by product classifier 702. A brand name may be a company name or trademark listed as a maker or provider of a product. Examples include "Nike" and "Black & Decker."

As shown in FIG. 10, the method of flowchart 1000 begins at step 1002, during which search engine 704 receives search query 710. In step 1004, search engine 704 determines that search query 710 is associated with a particular brand name. Search engine 704 may use any suitable method to determine that search query 710 is associated with the particular brand name. In step 1006, at least one newly identified product 714 is associated with the particular brand name based on the associations between categories and products created by product classifier 702. Search engine 704 can provide information about newly identified product 714 to the user who initiated search query 710.

In one embodiment of the method of flowchart 1000, search engine 704 will include products carrying the same brand name as that associated with the search query in the at least one newly identified product 714. In another embodiment, when there is more than one product identified by search engine 704 the products may not be ranked, but instead displayed in a manner that offers the user a diverse cross-section of products to view.

D. Example Product Classifier and Recommendation Engine

Figure 11:
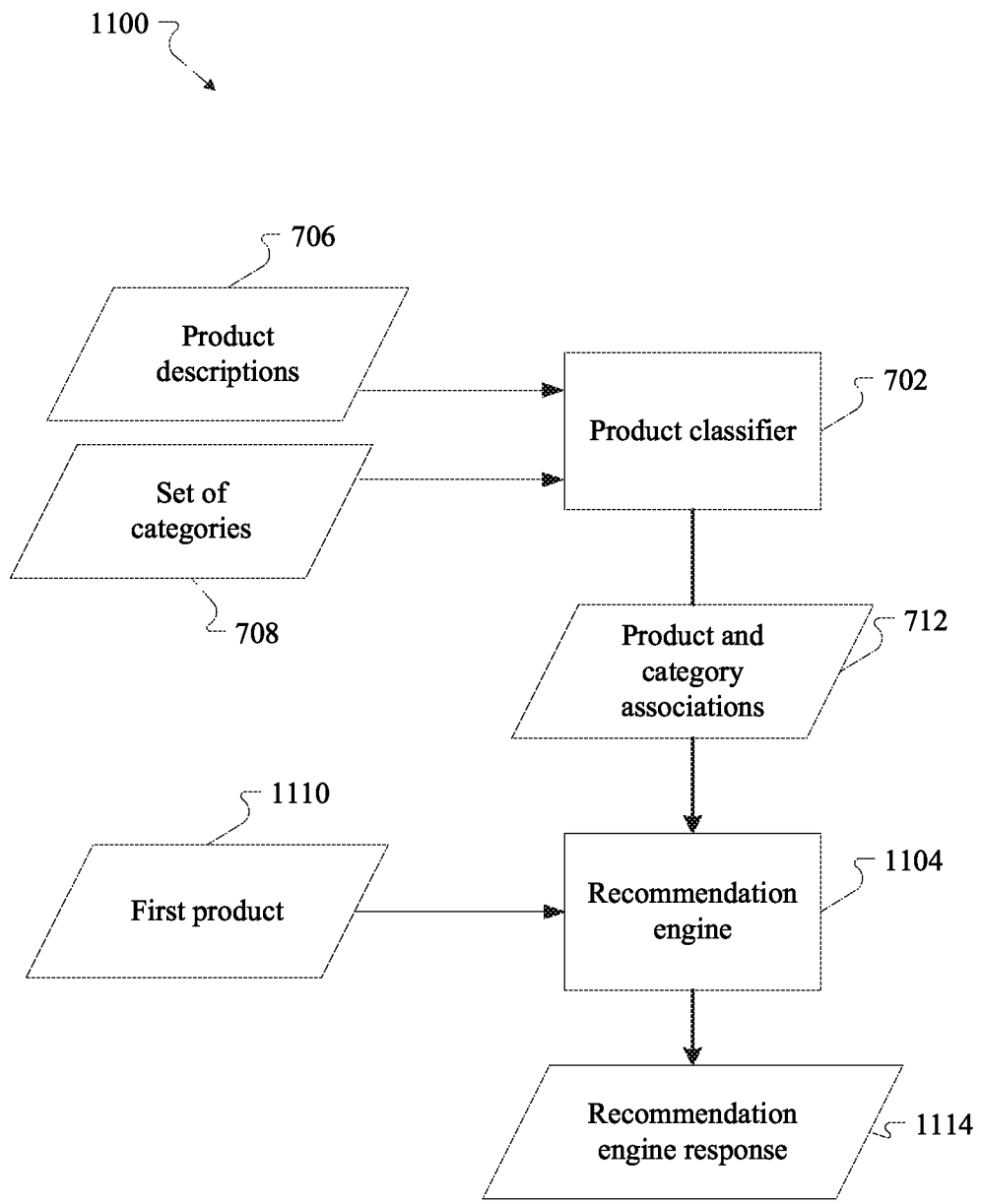
FIG. 11 is a block diagram of a system including a product classifier and a recommendation engine, in accordance with an exemplary embodiment.

FIG. 11 depicts an example recommendation system 1100 in accordance with an embodiment. As shown in FIG. 11, recommendation system 1100 includes a product classifier 702 and a recommendation engine 1104. Product classifier 702 receives product descriptions 706 and set of categories 708 and utilizes such information to produce product and category associations 712 in a manner described above in reference to FIG. 7.

Recommendation engine 1104 comprises a system that is designed to generate recommendations for related products when a user views a first product 1110 on a web page. Recommendation engine 1104 is initiated when a user accesses a web page associated with first product 1110. After determining what categories are associated with first product 1110 by consulting product and category associations 712, recommendation engine 1104 identifies further products that may be found in the same one or more categories in product and category associations 712, and returns recommendation engine response 1114. Recommendation engine response 1114 contains one or more products that are associated with first product 1110. In embodiments, recommendation engine response 1114 may be ranked or unranked.

E. Example Computer Implementation

Figure 12:
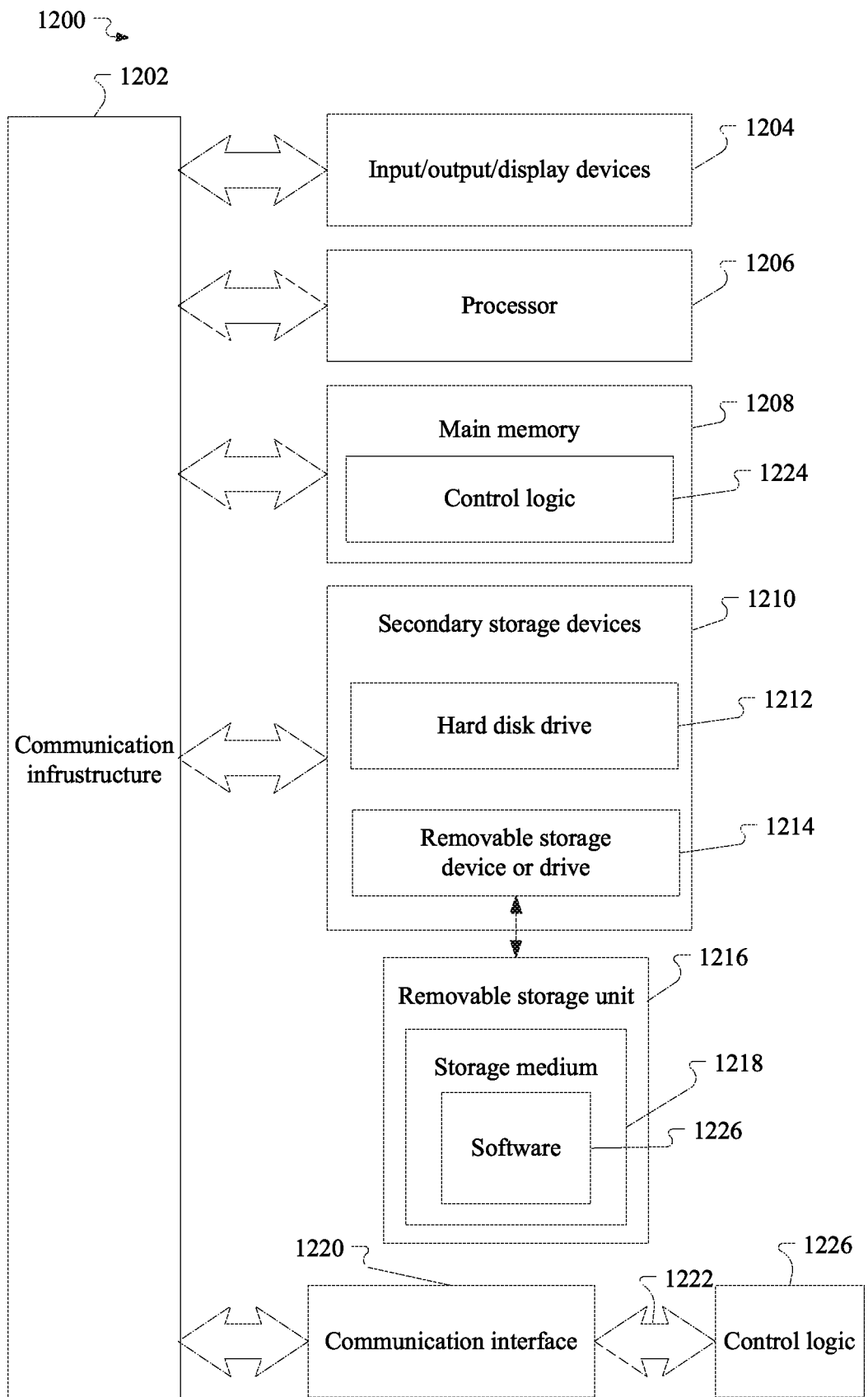
FIG. 12 is a block diagram of a computer in which embodiments may be implemented.

The embodiments described herein, including systems, methods/processes, and/or apparatuses, may be implemented using well known servers/computers, such as computer 1200 shown in FIG. 12. For example, any of user systems 102, 104, . . . 106, any of servers 110, 112, . . . 114, search engine 116, product classifier 118, recommendation engine 120, information retrieval system 700 or any component thereof, recommendation system 1100 of any component thereof, and each of the steps of flowcharts 200, 400, 500, 800, 900, and 1000 may be implemented using one or more computers 1200.

Computer 1200 can be any commercially available and well known computer capable of performing the functions described herein, such as computers available from International Business Machines, Apple, Sun, HP, Dell, Cray, etc. Computer 1200 may be any type of computer, including a desktop computer, a server, etc.

As shown in FIG. 12, computer 1200 includes one or more processors (e.g., central processing units (CPUs)), such as processor 1206. Processor 1206 is connected to a communication infrastructure 1202, such as a communication bus. In some embodiments, processor 1206 can simultaneously operate multiple computing threads.

Computer 1200 also includes a primary or main memory 1208, such as a random access memory (RAM). Main memory 1208 has stored therein control logic 1224 (computer software), and data.

Computer 1200 also includes one or more secondary storage devices 1210. Secondary storage devices 1210 include, for example, a hard disk drive 1212 and/or a removable storage device or drive 1214, as well as other types of storage devices, such as memory cards and memory sticks. For instance, computer 1200 may include an industry standard interface, such as a universal serial bus (USB) interface for interfacing with devices such as a memory stick. Removable storage drive 1214 represents a floppy disk drive, a magnetic tape drive, a compact disk drive, an optical storage device, tape backup, etc.

Removable storage drive 1214 interacts with a removable storage unit 1216. Removable storage unit 1216 includes a computer useable or readable storage medium 1218 having stored therein computer software 1226 (control logic) and/or data. Removable storage unit 1216 represents a floppy disk, magnetic tape, compact disc (CD), digital versatile disc (DVD), Blue-ray disc, optical storage disk, memory stick, memory card, or any other computer data storage device. Removable storage drive 1214 reads from and/or writes to removable storage unit 1216 in a well-known manner.

Computer 1200 also includes input/output/display devices 1204, such as monitors, keyboards, pointing devices, microphones, motion capture devices, etc.

Computer 1200 further includes a communication interface 1220. Communication interface 1220 enables computer 1200 to communicate with remote devices. For example, communication interface 1220 allows computer 1200 to communicate over communication networks or mediums 1222 (representing a form of a computer useable or readable medium), such as local area networks (LANs), wide area networks (WANs), the Internet, etc. Communication interface 1220 may interface with remote sites or networks via wired or wireless connections. Examples of communication interface 1220 include but are not limited to a modem, a network interface card (e.g., an Ethernet card), a communication port, a Personal Computer Memory Card International Association (PCMCIA) card, etc.

Control logic 1226 may be transmitted to and from computer 1200 via communication medium 1222.

Any apparatus or manufacture comprising a computer useable or readable medium having control logic (software) stored therein is referred to herein as a computer program product or program storage device. This includes, but is not limited to, computer 1200, main memory 1208, secondary storage devices 1210, and removable storage unit 1216. Such computer program products, having control logic stored therein that, when executed by one or more data processing devices, cause such data processing devices to operate as described herein, represent embodiments of the application.

For example, any of user systems 102, 104, . . . 106, any of servers 110, 112, . . . 114, search engine 116, product classifier 118, recommendation engine 120, information retrieval system 700 or any component thereof, recommendation system 1100 or any component thereof, and each of the steps of flowcharts 200, 400, 500, 800, 900, and 1000 can be implemented as control logic that may be stored on a computer useable medium or computer readable medium, which can be executed by one or more processors to operate as described herein.

Computer readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

The invention can work with software, hardware, and/or operating system implementations other than those described herein. Any software, hardware, and operating system implementations suitable for performing the functions described herein can be used.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented on at least one machine having at least one processor, storage, and a communication platform connected to a network, the method comprising:
   receiving information about a plurality of products, the information about each of the plurality of products comprising a plurality of text metadata fields;
   receiving a set of categories arranged in one or more hierarchical structures;
   automatically determining, using the at least one processor, associations between the plurality of products and the set of categories by estimating a probability that each of the products belongs to each category in the set of categories by generating a feature vector for the each product by concatenating the respective plurality of text metadata fields into a paragraph, the associations specifying one or more categories from the set of categories associated with each of the plurality of products based upon at least one of the plurality of text metadata fields in accordance with each of the plurality of products, wherein each of the associations specifies that the respective product belongs to the respective one or more categories, the estimated probability being computed based on a prior probability of each of the products belonging to a particular category;
   receiving a search query input by a user to a search engine via the network;
   determining, using the search engine executed by the at least one processor, a first product responsive to the search query;
   identifying, using the at least one processor, a first category associated with a first hierarchical structure to which the first product belongs based upon the determined associations;
   identifying, using the at least one processor, a second category associated with a second hierarchical structure to which the first product belongs based upon the determined associations, wherein the second hierarchical structure is independent of the first hierarchical structure; and
   identifying, using the at least one processor, a second product belonging to the second category as a search result provided to the user via the network based at least upon the determined associations.

2. The method of claim 1, wherein automatically determining the associations between the plurality of products and the set of categories comprises:
   associating the product with a particular category in the set of categories if the estimated probability that the product belongs to the particular category is among a set of highest estimated probability results for the set of categories.

3. The method of claim 1, wherein estimating the probability that the each product belongs to each category in the set of categories comprises:
   processing the each feature vector in a machine learning classifier that estimates the probability that the each product belongs to the each category based upon the each feature vector.

4. The method of claim 1, wherein generating the each feature vector comprises:
   extracting one or more tokens from the paragraph; and
   deriving a frequency number for each token by counting instances of each token in the paragraph.

5. The method of claim 4, wherein generating the each feature vector comprises:
   weighting the frequency number associated with each token based on which text metadata field the token came from.

6. The method of claim 3, wherein processing the feature vector in a machine learning classifier comprises:
   processing the feature vector in a Naïve Bayes machine learning classifier.

7. The method of claim 3, wherein processing the feature vector in a machine learning classifier comprises:
   processing the feature vector in a machine learning classifier that has been trained using at least one product catalog that includes text information about one or more products and categories associated therewith.

8. The method of claim 1, wherein the plurality of text metadata fields includes a title associated with the product, a description of the product, and a brand name associated with the product.

9. The method of claim 1, further comprising:
   providing the specified one or more categories in association with each of the plurality of products to the search engine.

10. A system, comprising:
    one or more computing machines comprising hardware;
    a product classifier that is executed by at least one of the one or more computing machines to receive information about a plurality of products, the information about each of the plurality of products comprising a plurality of text metadata fields, to receive a set of categories arranged in one or more hierarchical structures, and to automatically associate each product with one or more categories from the set of categories by estimating a probability that the each product belongs to each category in the set of categories by generating a feature vector by concatenating the plurality of text metadata fields associated with the each product into a paragraph, wherein each of the associations specifies that the respective product belongs to the respective one or more categories, the estimated probability being computed based on a prior probability of each of the products belonging to a particular category; and
    a search engine that is executed by at least one of the one or more computing machines to receive a search query input by a user to the search engine via a computer network, to determine a first product responsive to the search query, to identify a first category associated with a first hierarchical structure to which the first product belongs based upon the associations between categories and products generated by the product classifier, to identify a second category associated with a second hierarchical structure to which the first product belongs based upon the determined associations, and to identify a second product belonging to the second category as a search result provided to the user via the computer network based at least upon the associations between categories and products generated by the product classifier, wherein the second hierarchical structure is independent of the first hierarchical structure.

11. The system of claim 10, wherein the search engine is executed by at least one of the one or more computing machines to determine that the search query is associated with a particular brand name, and to identify products associated with the brand name that are also associated with a plurality of different categories based at least upon the associations between categories and products generated by the product classifier.

12. The system of claim 10, wherein the product classifier is executed by at least one of the one or more computing machines to associate the product with a particular category in the set of categories if the estimated probability that the product belongs to the particular category is among a set of highest estimated probability results for the set of categories.

13. The system of claim 12, wherein the product classifier is executed by at least one of the one or more computing machines to process the each feature vector in a machine learning classifier that estimates the probability that the each product belongs to the each category based upon the each feature vector.

14. The system of claim 13, wherein the product classifier is executed by at least one of the one or more computing machines to generate the feature vector by extracting one or more tokens from the paragraph, and deriving a frequency number for each token by counting instances of each token in the paragraph.

15. The method of claim 2, wherein said associating comprises associating the product with the particular category if the estimated probability that the product belongs to the particular category is the highest estimated probability for the set of categories.

16. The method of claim 2, wherein said associating comprises associating the product with the particular category if the estimated probability that the product belongs to the particular category exceeds a certain threshold.

17. The system of claim 10, wherein the set of categories received by the product classifier comprises a plurality of classification trees, the plurality of classification trees storing the set of categories in a hierarchical manner, and wherein the one or more categories automatically associated by the product classifier with at least one of the products belong to more than one classification tree among the plurality of classification trees.

18. The method of claim 1, further comprising:
determining, using the search engine executed by the at least one processor, a user has accessed to an online document associated with a third product via the computer network;
identifying, using the search engine executed by the at least one processor, one or more categories from the set of categories associated with the third product based at least upon the determined associations; and
identifying, using the search engine executed by the at least one processor, a fourth product associated with the one or more categories as a recommendation to the user via the computer network based at least upon the associations.

19. The system of claim 10, further comprising:
a recommendation engine that is executed by at least one of the one or more computing machines configured to:
determine that a user has accessed to an online document associated with a third product;
identify one or more categories from the set of categories associated with the third product based at least upon the determined associations; and
identify a fourth product associated with the one or more categories as a recommendation to the user via the computer network based at least upon the associations.

20. A method implemented on at least one machine having at least one processor, storage, and a communication platform connected to a network, the method comprising:
receiving information about a plurality of products, the information about each of the plurality of products comprising one or more text metadata fields;
receiving a set of categories arranged in a first hierarchical structure associated with a first merchant and in a second hierarchical structure associated with a second merchant different from the first merchant;
estimating, using the at least one processor, a probability that each product of the plurality of products belongs to each category in the set of categories based upon at least one of the corresponding one or more text metadata fields;
automatically determining, using the at least one processor, associations between the plurality of products and the set of categories, the associations specifying one category from the set of categories to be associated with each of the plurality of products based upon the corresponding estimated probability exceeding a certain threshold, wherein the estimated probability is computed based on a prior probability of each of the products belonging to a particular category;
automatically determining, using the at least one processor, an association for each of the plurality of products with at least one additional category in the set of categories, when the estimated probability that the product belongs to the at least one additional category exceeds the certain threshold;
receiving a search query input by a user to a search engine via the network;
determining, using the search engine executed by the at least one processor, a first product responsive to the search query;
identifying, using the at least one processor, at least one category of the set of categories to which the first product belongs based at least upon the associations determined prior to the search query input being received; and
identifying, using the at least one processor, at least one other category of the set of categories to which the first product belongs based at least upon the associations determined prior to the search query input being received, wherein the at least one other category is different from the at least one category; and
identifying, using the at least one processor, a second product belonging to the at least one other category as a search result provided to the user via the computer network based at least upon the associations determined prior to the search query input being received, wherein the first and second categories belong to the first and second hierarchical structures, respectively, and wherein the first hierarchical structure is independent of the second hierarchical structure.

\* \* \* \* \*